United States Patent [19]

Shirakawa

[11] Patent Number: 5,638,462

[45] Date of Patent: Jun. 10, 1997

[54] METHOD AND APPARATUS FOR RECOGNIZING GRAPHIC FORMS ON THE BASIS OF ELEVATION ANGLE DATA ASSOCIATED WITH SEQUENCE OF POINTS CONSTITUTING THE GRAPHIC FORM

[75] Inventor: Takahisa Shirakawa, Tokyo, Japan

[73] Assignee: NEC Corporation, Tokyo, Japan

[21] Appl. No.: 360,293

[22] Filed: Dec. 21, 1994

[30] Foreign Application Priority Data

Dec. 24, 1993 [JP] Japan .................................. 5-326789
Dec. 28, 1993 [JP] Japan .................................. 5-334648

[51] Int. Cl.$^6$ ........................................ G06K 9/62
[52] U.S. Cl. ............................... 382/186; 382/203
[58] Field of Search ................................. 382/186, 190, 382/195, 201, 202, 203

[56] References Cited

U.S. PATENT DOCUMENTS 4,731,858  3/1988  Grasmueller et al. ................. 382/9
4,845,764  7/1989  Ueda et al. ............................ 382/8
5,036,544  7/1991  Sakaue et al. ........................ 382/24

FOREIGN PATENT DOCUMENTS 63-024473  2/1988  Japan .................. G06F 15/70
63-276182  11/1988  Japan .................. G06F 15/66
4-160687   6/1992  Japan .................. G06K 9/46

*Primary Examiner*—Leo Boudreau
*Assistant Examiner*—Andrew W. Johns
*Attorney, Agent, or Firm*—Foley & Lardner

[57] ABSTRACT

A graphic form recognizer including a separate elevation angle computation and storage unit for extracting two reference points selected from a sequence of points constituting a predetermined section of an input graphic form and computing a separate elevation angle formed by line segments joining each of points of the sequence sandwiched between the reference points and each of the two reference points to compute a mean value, variance and mode of the separate elevation angle, a feature point extraction unit including a reference point setting portion and a reference point storage portion for further dividing the section sandwiched between the two reference points or integrating the section with another contiguous section according to said computed mean value and variance of the separate elevation angle, and a line kind determination unit for determining a kind of a line sandwiched between the two reference points according to the computed variance and mode of the separate elevation angle.

13 Claims, 10 Drawing Sheets

BURST NOISE

RANDOM NOISE

METHOD AND APPARATUS FOR RECOGNIZING GRAPHIC FORMS ON THE BASIS OF ELEVATION ANGLE DATA ASSOCIATED WITH SEQUENCE OF POINTS CONSTITUTING THE GRAPHIC FORM

BACKGROUND OF THE INVENTION

1. Field of the Invention

The present invention relates to a graphic form recognizer for use as an input unit of a computer system or the like for recognizing line graphic forms, and more particularly, to a device for recognizing handwritten graphic forms created by using a digitizer or a tablet.

2. Description of the Related Art

Among graphic form recognizers used for inputting line graphic forms to a computer system, etc. are a drawing reader which reads drawings by using an optical means and an interactive drawing input device using a digitizer or a tablet. In general, these graphic form recognizers recognize a graphic form by dividing a line constituting the graphic form into sections each composed of basic line segments such as a straight line and a circular arc and specifying position of points including a flection point and an inflection point (hereinafter, referred to as feature points) which divide the graphic form and a kind of a line segment (line kind) constituting the section to calculate consistency with predetermined dictionary data.

Such graphic form recognition requires, on condition that a line graphic form is constituted by a sequence of successive points, extraction of feature points from the respective points constituting the graphic form and determination of a line kind of a section sandwiched between the feature points.

Conventionally, the following two kinds of means are mainly used to determine whether a point on a graphic form is a feature point or not.

A first means is to extract sample points, at a predetermined distance, from points constituting a graphic form made up of a sequence of points and regard, as a feature point, a section where an elevation angle or a rate of change of an elevation angle is larger than a predetermined value, which elevation angle is formed by two line segments created by Joining three sample points located at the interval of n points. Such means is recited in, for example, Patent Publication No. H4-62107 and Patent Laying-Open No. S63-24473.

The conventional graphic form recognizer reads a graphic form by using an optical means and the like, makes a sequence of points out of the graphic form and extracts sample points from among point data of the graphic form of a sequence of points. Then, the recognizer extracts feature points from the sample points and determines whether a line segment of a section between the feature points is a straight line or a curve. The recognizer then recognizes a shape of the graphic form based on a position of the feature point and a line kind to display the recognition results on a display etc.

Herein, the conventional graphic recognizer described above determines whether point data of each sample point is regarded as a feature point or not based on an elevation angle formed by two line segments created by joining three sample points located at the interval of n points. More specifically, with n=1, an elevation angle is formed by two line segments created by joining three adjacent sample points. The elevation angle may be computed by performing calculations of an arithmetical mean of elevation angles at a predetermined number of points, that is, by smoothing process according to the moving average method. In finding a feature point, determination that a sample point in question is a feature point or not can be made when an obtained elevation angle is larger than a predetermined value or when a difference between two elevation angles adjacent to each other is larger than a predetermined value.

A function of the above-described adjacent elevation angle represented on a coordinate plane is as shown in FIG. 11A, with a value of an adjacent angle as the ordinate and a distance as the abscissa. In the figure, steps and peaks can be used for the determination of feature points and a gradient of a line segment for the determination of a kind of line.

A second means for determining feature points is to divide a graphic form according to predetermined rules, approximate the graphic form by broken lines by joining the divisional sections by straight lines, determine whether each division point, which is a connection between straight lines, is an angle, or a portion to be united into a single curve or a single straight line based on a value of an elevation angle formed by two line segments and take, as a feature point, a division point remaining to the last without integration into a single curve or a straight line as a point to form an angle. The foregoing means is recited, for example, in Japanese Patent Laying-Open No. S58-62767 and Japanese Patent Laying-Open No. H4-160687.

Japanese Patent Laying-Open No. S58-62767 recites a method of dividing a graphic form such that a distance between a straight line formed by joining two arbitrary points and a sequence of points in a section sandwiched between the two points is not larger than a fixed value. Recited in Japanese Patent Laying-Open No. H4-160687 is a method of determining whether or not to divide a section based on the dimensions of a region surrounded by a straight line created by joining two arbitrary points on the graphic form and by a sequence of points of the section.

This conventional graphic form recognizer extracts a maximum value of a distance between a point sequence between two predetermined reference points and a straight line linking the reference points, and data of a point positioned at the largest distance from the straight line joining the reference points. Then, when the maximum value of a distance between the point of the sequence and the straight line is larger than a predetermined value, the extracted point data is stored as a reference point. With respect to a graphic form approximated by broken lines in this manner, determination is made whether a division point, which is a connection between two adjacent straight lines, is an angle, or a portion to be united into a single curve or a single straight line based on a value of the center elevation angle to execute integration processing of the section when necessary. Then, point data of a division point remaining to the last is output as a feature point.

As described in the foregoing, recognition of a graphic form by using a graphic form recognizer also requires determination of a kind of a line of a section sandwiched between feature points. One of conventional manners for such determination is finding a total curvature of a graphic form by executing smoothing processing with respect to an elevation angle formed by line segments joining each point of a point sequence according to the moving average method and determining a kind of a line of a section in question based on the total curvature, which is recited in, for example, Japanese Patent Laying-Open No. S63-276182. In addition to implementing the above-described line kind determination means, the graphic form approximation device recited in the article reduces roundness of a graphic form generated during the averaging process by correcting the vicinity of an inflection point and that of a connection between a straight line and a circular arc. The article also discloses an arrangement to realize approximation of a graphic form. In combination with a means for calculating consistency of a feature point and a kind of a line segment with dictionary data, this arrangement will be allowed to carry out graphic form recognition.

This conventional graphic form recognizer finds an angle formed by a direction joining two successive points on an input graphic form and a fixed reference direction (hereinafter, referred to as a total curvature) and determines a line kind based on a total curvature corresponding to each sample point between the successive feature points.

More specifically, smoothing processing according to the moving average method is executed by inputting point data of a sample point to find a total curvature (θ) at each sample point and computing, with respect to each sample point, an arithmetical mean of total curvatures (θ) of a n number of preceding and a n number of succeeding points to the sample point. Then, an average gradient of the total curvature E (θ) of each sample point between two feature points is obtained to make determination that a section sandwiched between the feature points is a circular arc when the absolute value of the average gradient of the total curvature is within a fixed range and that the section sandwiched between the feature points is a straight line when the absolute value is approximately 0.

Illustration of the function of a total curvature E (θ) expressed on a coordinate plane is FIG. 12A, wherein the ordinate represents the total curvature and the abscissa represents a distance. Depending on a gradient of a line segment shown in the figure, a line kind can be determined.

The foregoing graphic form recognizer may cause random noise or burst noise when in inputting a graphic form, which leads to reduction of input precision. An optical reader used for inputting a graphic form generates random noise referred to as edge noise when binarizing an analog waveform output from a CCD sensor. Such device for reading a handwritten locus by a tablet etc. also generates random noise including a shake of a hand. A built-in-display tablet in which an LCD and a tablet are integrated generates a burst noise due to electro-magnetic wave emitted from the LCD and from other causes.

FIG. 8 is a diagram showing an example of output results, including random noise and burst noise, of a graphic form input unit 11.

The above-described conventional graphic form recognizer removes effects of these noises by adjusting various parameters according to a state of the noises.

For example, when in extracting sample points from an input graphic form made of a sequence of points, the adjustment is made such as by thinning out points of the sequence on a basis of a length enough for excluding effects of noise generated at the time of inputting a graphic form, adjusting the number of points between sample points at the time of computing adjacent elevation angles or a number of points for use in the moving average method, and adjusting the number of points necessary in the moving average method for computing a total curvature.

These conventional methods may not fully remove the effects of noise because of difficulty in adjustment.

In the adjustment by thinning-out processing, for example, too large a thinning-out distance, aimed at increasing a noise removal capability, results in thinning out points in the neighborhood of a target point to be extracted as a feature point. As a result, the feature point will be displaced to prevent creation of a fair copy whose form is corrected or lead to an error in the number of feature points and misidentification of a line kind. In addition, the number of sample points which can be used for line kind determination is reduced, so that enough reliability of line kind determination can not be achieved.

In other words, at the time of extracting sample points, when thinning-out is executed on various conditions provided for removing only random noise as shown in FIG. 9, a thinning-out determination unit can not remove burst noise but misidentifies the position of the noise as a feature point.

On the other hand, on various conditions set for removing burst noise as well as random noise as shown in FIG. 10, there is a case where a point in the vicinity of a sample point to be initially regarded as a feature point is thinned out, causing omission of the extraction of feature points or misidentification of a line kind.

In the adjustment according to the moving average method, too large a number of points for use in smoothing processing aimed at increasing a noise removing capability leads to excessive smoothing, resulting in misidentifying curves other than circular arcs as circular arcs or making determination of a kind of short lines difficult.

In other words, with little noise, an elevation angle function and a total curvature function obtained by the moving average method will be expressed by a level straight line, or a slanting straight line or a curve according to a kind of a line of an input graphic form, for example, as shown in FIGS. 11A and 12A, while with too large burst noise etc. to be removed, a relationship between a kind of a line of the input graphic form and characteristics of the elevation angle function will be difficult to extract or be lost.

The adjustment in the number of points between sample points necessary for computation of adjacent elevation angles is of little effect for removing burst noise. More specifically, when a center sample point is a burst noise, an elevation angle becomes unduly large, so that the part is often misidentified as a feature point. In addition, too large a number of points between sample points set to increase a random noise removing capability results in that a curve portion with a large total curvature will have an unduly large elevation angle. As a result, there occurs a case where a feature point is found at a curve portion.

A graphic form recognizer which determines feature points by approximating a graphic form by broken lines, processing a division point in question based on a value of an elevation angle formed by two line segments and taking the remaining division point as a feature point is relatively unsusceptible to such effect of random noise as described above. In particular, burst noise is of little effect when in using, as a guide to determination for division, an area of a region surrounded by a straight line joining reference points and a sequence of points sandwiched by the reference points.

While the above method causes no problem with a graphic form made up of straight lines only, it does with a graphic form including a curve portion because the curve portion is also approximated by broken lines made up of several straight lines.

More specifically, in the approximation of a curve portion by broken lines, each elevation angle of a broken line might vary even in the same circular arc because of variation in division according to threshold values. Integration processing using such elevation angles and changes of the same leads to misidentification.

In addition, an unnecessarily large number of divisions of a curve portion sacrifices a processing speed.

SUMMARY OF THE INVENTION

A first object of the present invention is to provide a graphic form recognizer capable of extracting a feature point with high accuracy and at a high speed without being adversely affected by random noise and burst noise.

A second object of the present invention, in addition to the above object, is to provide a graphic form recognizer capable of determining a kind of a line with high accuracy and at a high speed without being adversely affected by random noise and burst noise.

According to one aspect of the invention, a graphic form recognizer comprising:

input means for inputting a graphic form to recognize the graphic form as a sequence of points;

feature point extracting means for extracting feature points including an endpoint, a flection point and an inflection point of the input graphic form, from the sequence of points constituting the input graphic form;

line kind determining means for determining a kind of a line of a section sandwiched between said extracted feature points based on the extracted feature points and the sequence of points between the feature points; and determining means for determining a shape of the input graphic form based on said feature points and said determined line kind;

said feature point extracting means including:

means for extracting two reference points selected from a sequence of points constituting a predetermined section of an input graphic form and finding a separate elevation angle formed by each line segment joining each point of said sequence of points sandwiched between the reference points and each of the two reference points to compute a mean value and variance of the separate elevation angle; and means for dividing the section sandwiched between said two reference points or integrating the section with other contiguous section according to said computed mean value and variance of the separate elevation angle.

In the preferred construction, said means for dividing and integrating the section comprises means for setting, as a new reference point for dividing the section between said two reference points, a point at which a rate of change of an adjacent elevation angle is the largest, when said computed variance of the adjacent elevation angle is not less than a predetermined threshold value.

In the above-mentioned construction, said means for dividing and integrating the section comprises:

means for converting said mean value of the adjacent elevation angle into a curvature of a section sandwiched between two reference points;

means for comparing the curvature of the section sandwiched between said two reference points with a curvature of other section adjacent to said section when no new reference point for dividing said section is set; and means for integrating the two sections into one section when the difference between the curvatures is not greater than a predetermined threshold value.

In the above-mentioned construction, said means for dividing and integrating the section comprises:

means for setting, as a new reference point for dividing the section between said two reference points, a point at which a rate of change of an adjacent elevation angle is the largest, when said computed variance of the adjacent elevation angle is not less than a first predetermined threshold value;

means for converting said mean value of the adjacent elevation angle into a curvature of a section sandwiched between two reference points;

means for comparing the curvature of the section sandwiched between said two reference points with a curvature of other section adjacent to said section when no new reference point for dividing said section is set; and means for integrating the two sections into one when the difference between the curvatures is not greater than a second predetermined threshold value.

According to another aspect of the invention, a graphic form recognizer comprising:

input means for inputting a graphic form to recognize the graphic form as a sequence of points;

feature point extracting means for extracting feature points including an endpoint, a flection point and an inflection point of the input graphic form, from the sequence of points constituting the input graphic form;

line kind determining means for determining a kind of a line of a section sandwiched between said extracted feature points based on the extracted feature points and the sequence of points between the feature points; and determining means for determining a shape of the input graphic form based on said feature points and said determined line kind;

said line kind determining means including:

means for extracting two reference points selected from a sequence of points constituting a predetermined section of an input graphic form and finding a separate elevation angle formed by each line segment joining each point of said sequence of points sandwiched between the reference points and each of the two reference points to compute variance and a mode of the separate elevation angle; and means for determining a kind of a line sandwiched between said two reference points according to said computed mean value and variance of the separate elevation angle.

In the preferred construction, said means for determining a kind of a line of a section compares said variance and mode of the separate elevation angle with first and second threshold values, respectively, to determine that the section sandwiched between said two reference points is a straight line when the variance of separate elevation angle is not greater than the first threshold value and the absolute value of the mode is not greater than the second threshold value, determine that the section sandwiched between said two reference points is a circular arc when the variance of separate elevation angle is not greater than the first threshold value and the absolute value of the mode is greater than the second threshold value and determine that the section sandwiched between said two reference points is a curve other than a circular arc when the variance of separate elevation angle is greater than the first threshold value.

According to another aspect of the invention, a graphic form recognizer comprising:

input means for inputting a graphic form to recognize the graphic form as a sequence of points;

means for extracting two reference points selected from a sequence of points constituting a predetermined section of an input graphic form and finding a separate elevation angle formed by each line segment joining each point of said sequence of points sandwiched between the reference points and each of the two reference points to compute a mean value and variance of the separate elevation angle;

feature point extracting means for extracting feature points including an endpoint, a flection point and an inflection point of the input graphic form from the sequence of points constituting the input graphic form;

line kind determining means for determining a kind of a line of a section sandwiched between said extracted feature points based on the extracted feature points and the sequence of points between the feature points; and determining means for determining a shape of the input graphic form based on said feature points and said determined line kind;

said feature point extracting means including means for dividing the section sandwiched between said two reference points or integrating the section with other contiguous section according to said computed mean value and variance of the separate elevation angle; and said line kind determining means including determining means for determining a kind of a line of the section sandwiched between said two reference points according said compute variance and mode of the separate elevation angle.

In the above-mentioned construction, the feature point extracting means comprises:

means for setting, as a new reference point for dividing the section between said two reference points, a point at which a rate of change of an adjacent elevation angle is the largest, when said computed variance of an adjacent elevation angle is not less than a first predetermined threshold value;

means for converting said mean value of the adjacent elevation angle into a curvature of a section sandwiched between two reference points;

means for comparing the curvature of the section sandwiched between said two reference points with a curvature of other section adjacent to said section when no new reference point for dividing said section is set; and means for integrating the two sections into one when the difference between the curvatures is not greater than a second predetermined value.

Also, the line kind determining means compares said variance and mode of the separate elevation angle with first and second threshold values, respectively, to determine that the section sandwiched between said two reference points is a straight line when the variance of the separate elevation angle is not greater than the first threshold value and the absolute value of the mode is not greater than the second threshold value, determine that the section sandwiched between said two reference points is a circular arc when the variance of separate elevation angle is not greater than the first threshold value and the absolute value of the mode is greater than the second threshold value and determine that the section sandwiched between said two reference points is a curve other than a circular arc when the variance of separate elevation angle is greater than the first threshold value.

In the preferred construction, the feature point extracting means comprises:

means for setting, as a new reference point for dividing the section sandwiched between said two reference points, a point at which a rate of change of an adjacent elevation angle is the largest, when said computed variance of adjacent elevation angle is not less than a predetermined first threshold value;

means for converting said mean value of the adjacent elevation angle into a curvature of a section sandwiched between two reference points;

means for comparing the curvature of the section sandwiched between said two reference points with a curvature of other section adjacent to said section when no new reference point for dividing said section is set; and means for integrating the two sections into one when the difference between the curvatures is not greater than a second predetermined threshold value; and said line kind determining means compares said variance and mode of the separate elevation angle with first and second threshold values, respectively, to determine that the section sandwiched between said two reference points is a straight line when the variance of separate elevation angle is not greater than the first threshold value and the absolute value of the mode is not greater than the second threshold value, determine that the section sandwiched between said two reference points is a circular arc when the variance of separate elevation angle is not greater than the first threshold value and the absolute value of the mode is greater than the second threshold value and determine that the section sandwiched between said two reference points is a curve other than a circular arc when the variance of separate elevation angle is greater than the first threshold value.

According to a still further aspect of the invention, a method of recognizing a graphic form comprising:

input means for inputting a graphic form to recognize the graphic form as a sequence of points;

feature point extracting means for extracting feature points including an endpoint, a flection point and an inflection point of the input graphic form from the sequence of points constituting the input graphic form;

line kind determining means for determining a kind of a line of a section sandwiched between said extracted feature points based on the extracted feature points and the sequence of points between the feature points; and determining means for determining a shape of the input graphic form based on said feature points and said determined line kind;

processing of said feature point extracting means comprising the steps of:

extracting two reference points selected from a sequence of points constituting a predetermined section of the input graphic form and finding a separate elevation angle formed by each line segment joining each point in said sequence of points sandwiched between the reference points and each of the two reference points to compute variance and a mode of the separate elevation angle;

setting, as a new reference point for dividing the section between said two reference points, a point at which a rate of change of an adjacent elevation angle is the largest, when said computed variance of the adjacent elevation angle is not less than a first predetermined threshold value;

converting said mean value of the adjacent elevation angle into a curvature of a section sandwiched between two reference points;

comparing the curvature of the section sandwiched between said two reference points with a curvature of other section adjacent to said section when no new reference point for dividing said section is set; and integrating the two sections into one when the difference between the curvatures is not greater than a second predetermined value.

According to a still further aspect of the invention, a method of receiving a graphic form comprising:

input means for inputting a graphic form to recognize the graphic form as a sequence of points;

feature point extracting means for extracting feature points including an endpoint and, a flection point an inflection point of the input graphic form from the sequence of points constituting the input graphic form;

line kind determining means for determining a kind of a line of a section sandwiched between said extracted feature points based on the extracted feature points and the sequence of points between the feature points; and determining means for determining a shape of the input graphic form based on said feature points and said determined line kind;

the processing of said line kind determining means comprising the steps of:

extracting two reference points selected from a sequence of points constituting a predetermined section of an input graphic form and finding a separate elevation angle formed by each line segment joining each point in said sequence of points sandwiched between the reference points and each of the two reference points to compute variance and a mode of the separate elevation angle; and comparing said variance and mode of the separate elevation angle with the first and second threshold values, respectively, to determine that the section sandwiched between said two reference points is a straight line when the variance of separate elevation angle is not greater than the first threshold value and the absolute value of the mode is not greater than the second threshold value, determine that the section sandwiched between said two reference points is a circular arc when the variance of separate elevation angle is not greater than the first threshold value and the absolute value of the mode is greater than the second threshold value and determine that the section sandwiched between said two reference points is a curve other than a circular arc when the variance of separate elevation angle is greater than the first threshold value.

According to a still further aspect of the invention, a method of recognizing a graphic form comprising:

input means for inputting a graphic form to recognize the graphic form as a sequence of points;

means for extracting two reference points selected from a sequence of points constituting a predetermined section of the input graphic form and finding a separate elevation angle formed by each line segment joining each point in said sequence of points sandwiched between the reference points and each of the two reference points to compute variance and a mode of the separate elevation angle;

feature point extracting means for extracting feature points including an endpoint, a flection point and an inflection point of the input graphic form from the sequence of points constituting the input graphic form;

line kind determining means for determining a kind of a line of a section sandwiched between said extracted feature points based on the extracted feature points and the sequence of points between the feature points; and determining means for determining a shape of the input graphic form based on said feature points and said determined line kind;

processing of said feature point extracting means comprising the steps of:

setting, as a new reference point for dividing the section between said two reference points, a point at which a rate of change of an adjacent elevation angle is the largest, when said computed variance of the adjacent elevation angle is not less than a first predetermined threshold value;

converting said mean value of the adjacent elevation angle into a curvature of a section sandwiched between two reference points;

comparing the curvature of the section sandwiched between said two reference points with a curvature of other section adjacent to said section when no new reference point for dividing said section is set; and integrating the two sections into one when the difference between the curvatures is not greater than a second predetermined value;

processing of said line kind determining means comprising the step of:

comparing said variance and mode of the separate elevation angle with the first and second threshold values, respectively, to determine that the section sandwiched between said two reference points is a straight line when the variance of separate elevation angle is not greater than the first threshold value and the absolute value of the mode is not greater than the second threshold value, determine that the section sandwiched between said two reference points is a circular arc when the variance of separate elevation angle is not greater than the first threshold value and the absolute value of the mode is greater than the second threshold value and determine that the section sandwiched between said two reference points is a curve other than a circular arc when the variance of separate elevation angle is greater than the first threshold value.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative of the invention, but are for explanation and understanding only.

In the drawings.

DESCRIPTION OF THE PREFERRED EMBODIMENTS

Preferred embodiments of the present invention will be described in detail with reference to accompanying drawings.

Figure 1:
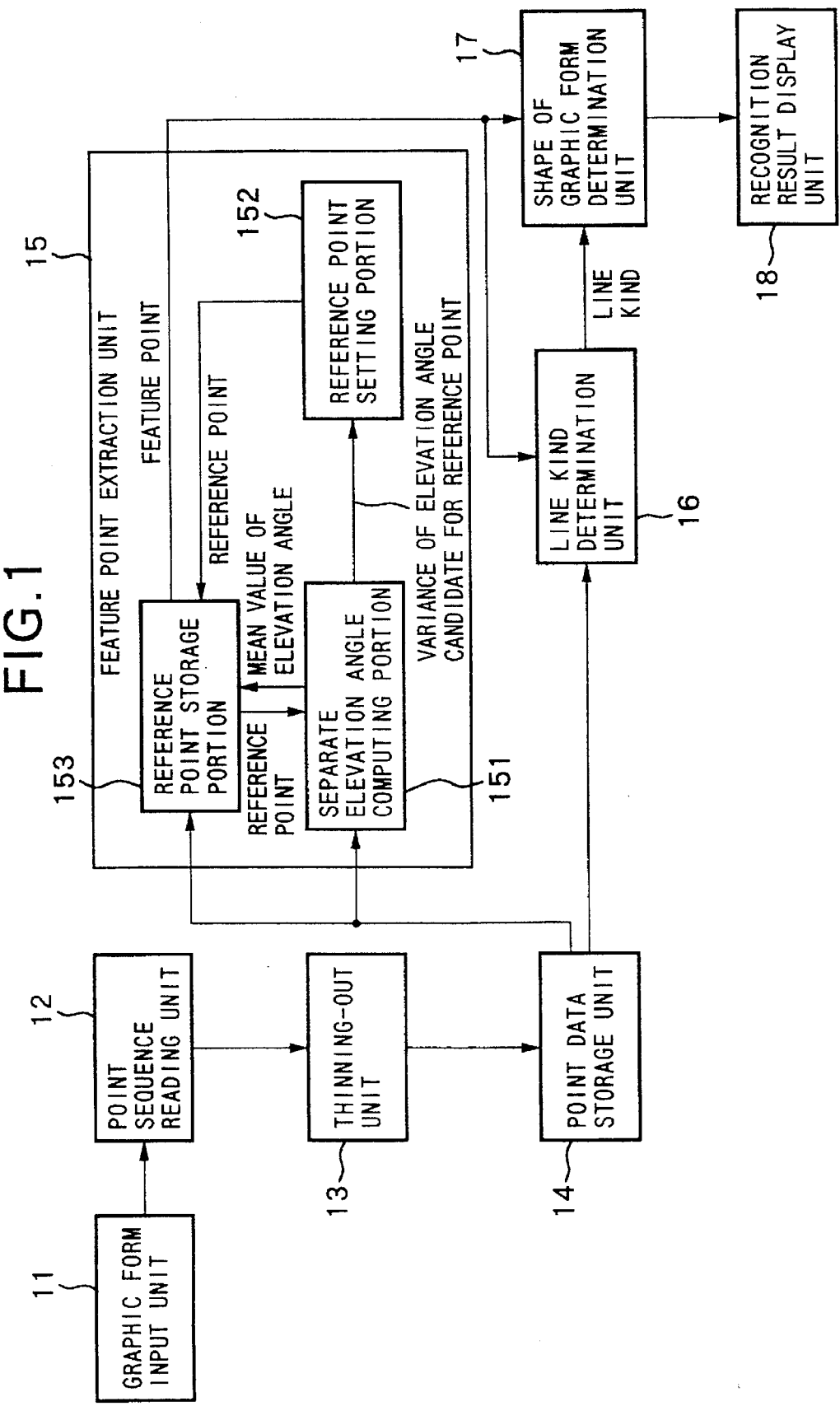
FIG. 1 is a block diagram showing an arrangement of a graphic form recognizer according to a first embodiment of the present invention.

FIG. 1 is a block diagram showing an arrangement of a graphic form recognizer according to a first embodiment of the present invention.

As illustrated in the figure, the graphic form recognizer of the present embodiment comprises a graphic form input unit 11, a point sequence reading unit 12 for making a point sequence out of a read graphic form, a thinning-out unit 13 for appropriately thinning out point data generated by the creation of a point sequence by the point sequence reading unit 12 to extract a sample point, a point data storage unit 14 for sequentially storing a predetermined number of point data of extracted sample points, a feature point extraction unit 15 for extracting a feature point from the respective sample points stored in the point data storage unit 14, a line kind determination unit 16 for determining a line kind of a section between two feature points based on point data of the two feature points and point data of sample points between the two feature points, a shape of graphic form determination unit 17 for recognizing a shape of a graphic form based on a position of a feature point and a line kind and a recognition result display unit 18 for displaying recognition results of the shape of graphic form determination unit 17 on a display means such as a display.

The graphic form input unit 11 is implemented by an optical reading means such as an image scanner, or a digitizer or a tablet. With an optical reading means, the graphic form input unit 11 converts a graphic form into image data by using, for example, a CCD sensor, and supplies the image data to the point sequence reading unit 12. On the other hand, with a digitizer or a tablet, the graphic form input unit 11 converts handwritings into point data including coordinate values by using, for example, a resistance film sensor, and supplies the point data to the point sequence reading unit 12.

The point sequence reading unit 12 is implemented under program control by a CPU of a personal computer or a workstation. When using an optical reading means as the graphic form input unit 11, the unit 12 performs line-thinning processing of supplied image data to convert the image data into successive point sequence data. When using a digitizer or a tablet as a graphic form input unit, the unit 12 reads point data from the graphic form input unit 11 at fixed intervals.

The thinning-out unit 13, to be implemented under program control by a CPU of a personal computer or a workstation, properly thins out point data input from the point sequence reading unit 12 and outputs the data as a sample point to the print data storage unit 14. At this time, initially taken as next sample points are point data first applied from the point sequence reading unit 12 and data of a point distant as much as a predetermined threshold value or more from the point data. Thereafter, the thinning-out unit finds a distance between point data newly input from the point sequence reading unit 12 and a sample point lastly output to the point data storage unit 14 to abandon the point when the distance is less than the predetermined threshold value and take the point as a next sample point when the distance is not less than the threshold value.

The point data storage unit 14, which is a first-in first-out (FIFO) type storage unit implemented by a RAM etc., is capable of sequentially storing a predetermined number of point data. When more than a predetermined number of point data is input, data will be abandoned in an order as they are input.

The feature point extraction unit 15 according to the present embodiment comprises a separate elevation angle computing portion 151 for finding an elevation angle formed by line segments joining each of two reference points selected from sample points and a sample point sandwiched between the reference points to compute its means value and variance, a reference point setting portion 152 for setting a reference point based on the computation result of the separate elevation angle computing portion 151, and a reference point storage portion 153 for storing a reference point set by the reference point setting portion 152. The separate elevation angle computing portion 151 and the reference point setting portion 152 are implemented under program control by a CPU of a personal computer or a workstation etc. The reference point storage portion 153 is implemented by a CPU operable under program control and a RAM or the like having a linear list structure or a tree structure.

The separate elevation angle computing portion 151 and the reference point setting portion 152 execute division processing for determining whether to further divide a section sandwiched between two successive reference points stored in the reference point storage portion 153 and integration processing for determining whether to integrate two successive sections stored in the reference point storage portion 153 into one section. These processings will be described in more detail later.

The separate elevation angle computing portion 151 first receives an input of two successive reference points from the reference point storage portion 153. Then, the portion 151 reads and sequentially notices point data of sample points sandwiched between the two reference points except for those in the neighborhood of both reference points. Since noticing all the sample points is redundant and consumes operation time, they can be thinned out at fixed intervals on this occasion. It is also possible to increase or decrease a thinning-out interval according to a number of sample points in the section in order to obtain a necessary number of notice points even from a small section and produce thinning-out effects even with a large section.

The separate elevation angle computing portion 151 then finds an elevation angle formed by two line segments joining each notice point and each of two reference points to compute its mean value and variance and extracts point data of a notice point at which a rate of change of an elevation angle is largest. Then, the portion 151 outputs the variance of the elevation angle and the point data having the largest rate of change of the elevation angle to the reference point setting portion 152 and the mean value of the elevation angle to the reference point storage portion 153.

The reference point setting portion 152 compares the variance of the elevation angle computed by the separate elevation angle computing portion 151 and a predetermined first threshold value set and stored beforehand. Then, when the variance of the elevation angle is larger than the first threshold value, the reference point setting portion outputs data of a point at which a rate of change of an elevation angle is the largest, as a new reference point for dividing a section between the two reference points to the reference point storage portion 153.

The reference point storage portion 153 stores the point data of the reference points applied from the reference point setting portion 152, and also converts the mean value of the elevation angle applied from the separate elevation angle computing portion 151 into a curvature of the section sandwiched between the two reference points and stores the curvature. Then, when such a new reference point is not set as dividing the section between the two reference points, the portion 153 compares the curvature of the section with a curvature of its contiguous section. When a difference between the curvatures is not greater than a second predetermined threshold value set and stored beforehand, the portion 153 integrates the two sections into one. In other words, the portion 153 computes a curvature of the integrated section by, for example, deleting a reference point sandwiched between the two sections and obtaining a mean value of curvatures of both sections.

In the initial state, the reference point storage portion 153 stores, for example, the first and last data out of the point data stored in the data storage unit 14 or a starting point and an ending point of a stroke in the input using a tablet as reference points. A curvature may be obtained from a mean elevation angle in the following manner. First, find a first isosceles triangle having a base being a straight line joining both reference points and an apex angle being equal to a mean elevation angle. Then, find a second isosceles triangle having a base being one of oblique lines of the first isosceles triangle and a base angle being half the mean elevation angle. As a result, the length of the oblique line of the second isosceles triangle will be the curvature.

As described in the foregoing, division and integration processings will be repeated until the reference point storage portion 153 has no section whose division determination is not made. Then, the reference point storage portion 153 outputs a reference point remaining to the last as a feature point.

The line kind determination unit 16, to be implemented under program control by a CPU of a personal computer or a workstation or the like, finds a total curvature of a section between feature points extracted by the feature point extraction unit 15 based on point data of the feature points and point data of sample points stored in the point data storage unit 14 and determines whether the section is a straight line or a curve based on the obtained total curvature. When the determination is made that the section is a curve, further determination is made that the curve is a circular arc or a curve other than a circular arc.

The shape of graphic form determination unit 17, to be implemented under program control by a CPU of a personal computer or a workstation or the like, obtains matching with recognition dictionary data defined beforehand for each category of graphic forms to be recognized, based on a position of the feature point extracted by the feature point extraction unit 15 and a line kind of each section determined by line kind determination unit 16. Then, the unit 17 recognizes a shape of the graphic form depending on the degree of the matching and supplies the result to the recognition result display unit 18.

The recognition result display unit 18, to be implemented by a displaying means such as a display, displays a graphic form of the recognition result obtained by the graphic form determination unit 17. Based on the display recognition result, an operator is allowed to make a fair copy of the graphic form by modifying its shape or a line kind through external command input and the like.

Now, operation for division and integration processings by the feature point extraction unit 15 will be described in detail with reference to the flow chart of FIG. 2 and FIGS. 3A to 3D.

Figure 3A:
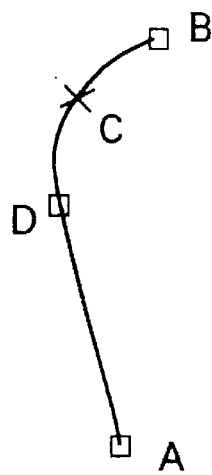
FIG. 3A is a diagram showing an example of an input graphic form in the present embodiment.

Assuming that an input graphic form is ADCB illustrated in FIG. 3A, feature points are three points, A, D and B. Two points A and B are easy to detect because they are endpoints of the graphic form ADCB. Then, the two points are stored as initial values of reference points in the reference point storage portion 153 to start division processing (Step 201). In the initial sate, since there is no section of which division determination is not made, the reference point storage portion 153 outputs the points A and B as reference points to the separate elevation angle computing portion 151 (Step 202).

The separate elevation angle computing portion 151 sequentially extracts sample points, except for those in the vicinity of both reference points A and B, as notice points at appropriate intervals according to the number of sample points between A and B (Step 203), to find elevation angles each formed by two line segments joining each notice point and each of the reference points A and B (Step 204). Then, the portion 151 computes a mean value and variance of these elevation angles (Step 205) and further selects a notice point at which a rate of change of an elevation angle is the largest (Step 206). The computed mean value of elevation angle is output to the reference point storage portion 153, where the value is converted into a curvature of a section sandwiched between the reference points A and B and then stored.

Figure 3B:
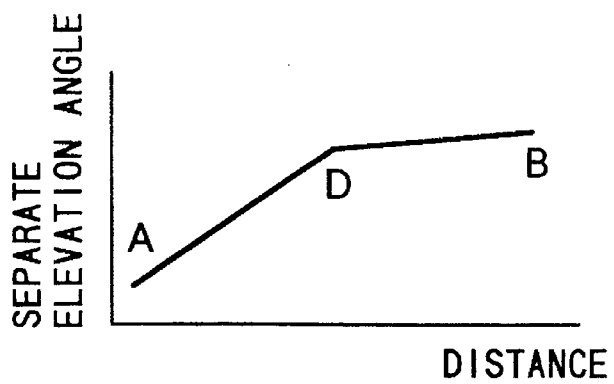
FIG. 3B is a diagram showing one example of results of processing of the graphic form illustrated in FIG. 3A according to the present embodiment.

In an ideal state without noise, an elevation angle using points A and B of the graphic form ADCB as reference points expressed on the coordinates is as shown in FIG. 3B, wherein the ordinate represents an elevation angle and the abscissa represents distance. In the figure, since variation due to random noise is too small as compared with a distance between a reference point and a notice point to exert large effects on the figure, but variation due to burst noise is less negligible as compared with a distance between a reference point and a notice point, so that it affects the figure.

Figure 3C:
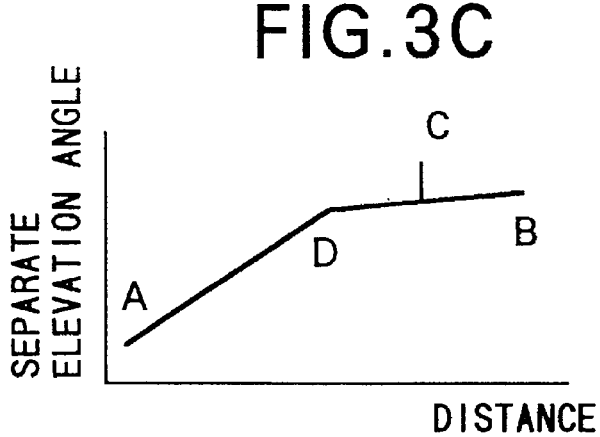
FIG. 3C is a diagram showing one example of results of processing of the graphic form illustrated in FIG. 3A according to the present embodiment.

When burst noise occurs at the point C between the curve portions B and D, elevation angles using the points A and B as the reference points will be as expressed by FIG. 3C. The following description will be made on the assumption that such input as shown in FIG. 3C is applied.

When the separate elevation angle computing portion 151 selects the point C as the notice point at which a rate of change of an elevation angle is the largest (Step 206), the reference point setting portion 152 compares variance (K) of elevation angle output from the separate elevation angle computing portion 151 and a predetermined first threshold value (L). As can been seen from FIG. 3C, values of elevation angles considerably vary, thus the variance (K) of elevation angle is greater than the predetermined first threshold value (L). The reference point setting portion 152 then stores the point C as a new reference point in the reference point storage portion 153 (Step 27). Then, the routine returns to Step 202 because two successive sections do not exist, of which division determination is finished (Step 209).

At this point of time, the three points, A, C and B are stored in the reference point storage portion 153 and there exist two sections AC and CB as the sections of which division determination is not made.

Then, the reference point storage portion 153 outputs the points A and C as reference points to the separate elevation angle computing portion 151.

The separate elevation angle computing portion 151 sequentially extracts sample points between A and C, except for those in the vicinity of both reference points A and C, as notice points, at appropriate intervals according to the number of points of the sequence between A and C to find an elevation angle formed by two line segments joining the notice point and each of the reference points A and B in the same manner as described above. Then, the portion 151 computes a mean value and variance of these elevation angles and selects a notice point at which the rate of elevation angle change is the largest (Steps 203 to 206). The means value of the elevation angle is output to the reference storage portion 153, where the mean value is converted into a curvature of the section sandwiched between the reference points A and C and stored.

Figure 3D:
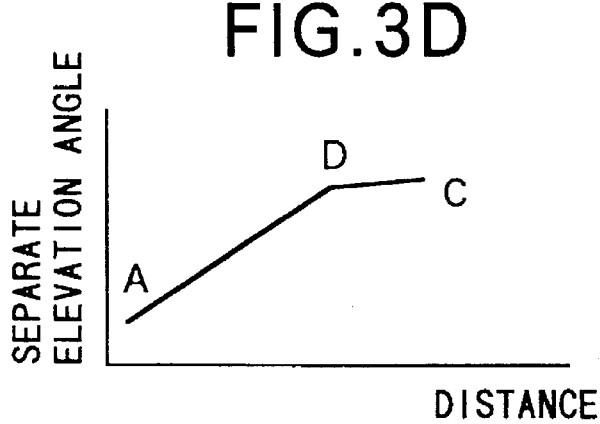
FIG. 3D is a diagram showing one example of results of processing of the graphic form illustrated in FIG. 3A according to the present embodiment.

An elevation angle using the points A and C of the graphic form ADCB as reference points will be as illustrated in FIG. 3D.

When the separate elevation angle computing portion 151 selects the point D as the notice point at which the rate of elevation angle change is the largest (Step 206), the reference point setting portion 152 compares the variance K of elevation angle output by the separate elevation angle computing portion 151 with the first threshold value L. As can be seen from FIG. 3D, the elevation angle varies so much that the variance K of elevation angle is greater than the first threshold value L. The reference point setting portion 152 accordingly stores the point D as a new reference point in the reference point storage portion 153. Then, the routine returns to Step 202 because two successive sections do not exist, of which division determination is finished (Step 209).

At this point of time, the four points A, D, C and B are stored in the reference point storage portion 153 and there exist three sections AD, DC and CB as the sections whose division determination is not made.

Then, the reference point storage portion 153 outputs the points A and D as reference points to the separate elevation angle computing portion 151.

The separate elevation angle computing portion 151 computes a mean value and variance of elevation angle to select a notice point at which a rate of elevation angle change is the largest, in the same manner as described above (Steps 203 to 206). The mean value of the elevation angle is output to the reference point storage portion 153, where the value is converted into a curvature of the section sandwiched between the reference points A and D and then stored.

Elevation angles using A and D as both reference points take on substantially 0 values because the AD section is straight. In other words, variance of the elevation angle is so small that the reference point setting portion 152 will not divide the section AD (Step 207). This is the end of the division determination of the section AD, and the routine returns to Step 202 because there is no other section whose division determination is finished (Step 209).

At this point of time, the four points A, D, C and B are stored in the reference point storage portion 153 and the two sections DC and CB exist as the sections whose division determination is not made.

The reference point storage portion 153 then outputs the points D and C as reference points to the separate elevation angle computing portion 151.

The separate elevation angle computing portion 151 computes a means value and variance of the elevation angle to select a notice point at which a rate of elevation angle change is the largest, in the same manner as described above (Steps 203 to 206). The mean value of the elevation angle is output to the reference storage portion 153, where the value is converted into a curvature of the section sandwiched between the reference points D and C and then stored.

Elevation angles using D and C as both reference points take on substantially constant values because the section DC is a circular arc. In other words, the variance of the elevation angle is so small that the reference point setting portion 152 will not divide the section DC (Step 207).

Herein, the sections AD and DC are two successive sections whose division determination is finished. The reference point storage portion 153 therefore compares the curvature of the section AD and that of the section DC (Step 209). However, the sections will not be integrated because the curvature of the section AD, which is infinite, and that of the section DC, which is equal to its radius, differ from each other.

At this point of time, four points, A, D, C and B are stored in the reference point storage portion 153 and there exists one section CB as the section whose division determination is not made.

The reference point storage portion 153 then outputs the points C and B as reference points to the separate elevation angle computing portion 151.

The separate elevation angle computing portion 151 computes a mean value and variance of the elevation angle to compute a notice point at which the rate of elevation angle change is the largest in the same manner as the foregoing (Steps 203 to 206). The mean value of the elevation angle is output to the reference point storage portion 153, where the value is converted into a curvature of the section sandwiched between the reference points C and B and then stored.

The elevation angles using C and B as both reference points take on substantially constant values because the section CB is a circular arc. In other words, the variance of the elevation angle is so small that the reference point setting portion 152 will not divide the section CB (Step 207).

Herein, since the sections DC and CB are two successive sections whose division determination is finished, the reference point storage portion 153 compares the curvature of the section DC with that of the section CB. Because the sections DC and OB are in the same circular arc, the comparison finds the difference between the two curvatures to be smaller than the second threshold value, so that the sections DC and CB are integrated with each other. In other words, deleting the reference point C, a curvature of the section DB is obtained based on that of the section DC and that of the section CB (Steps 210 and 211). Through these processings, the routine goes back to Step 202.

At this point of time, there exists in the reference point storage portion 153 no section whose division determination is not made. The stored three reference points, A, D and B are therefore output as feature points (Steps 202 and 212).

As described in the foregoing, the graphic form recognizer according to the present embodiment divides a graphic form into sections based on variance of an elevation angle formed by two line segments each joining each sample point sandwiched between two reference points and each of the reference points.

Because a line segment joining a sample point between reference points and each of the reference points is extremely long as compared with a line segment joining adjacent sample points with each other, the elevation angle varies little even with a change of position of a sample point. That is, the above recognizer is unsusceptible to the effects of random noise.

For the same reason as the above, the graphic form recognizer of the present embodiment can find an elevation angle of an input graphic form of the constant definition with high accuracy, which angle is a basis for the determination of section division.

In addition, since determination of section division is made based on variance of these elevation angles, there is no effect of burst noise occurring with low frequency even if the sample point has a wide variation of distance.

It is therefore possible to extract preferable feature points which are less affected by random noise or burst noise.

In addition, because variance of elevation angle is small not only with straight lines but also with curves having the same curvature, it is not necessary to divide a circular arc. As a result, creation of an erroneous feature point can be prevented in a curve portion.

Figure 4:
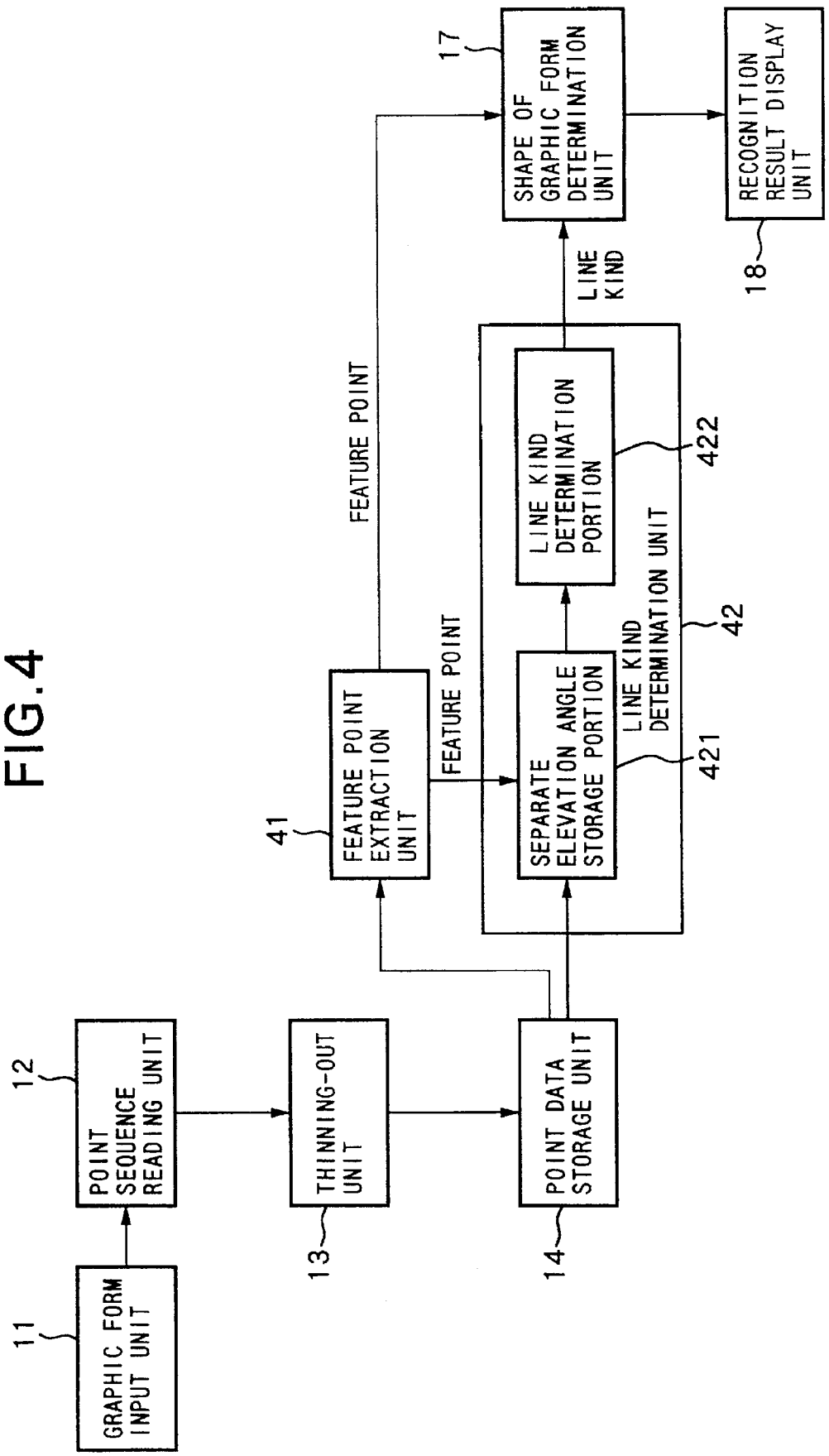
FIG. 4 is a block diagram showing an arrangement of a graphic form recognizer according to a second embodiment of the present invention.

FIG. 4 is block diagram showing an arrangement of a graphic form recognizer according to a second embodiment of the present invention.

As shown in the figure, the graphic form recognizer of the present embodiment comprises a graphic form input unit 11, a point sequence reading unit 12, a thinning-out unit 13, a point data storage unit 14, a shape of graphic form determination unit 17 and a recognition result display unit 18, all of which are the same as those of the first embodiment shown in FIG. 1, and further comprises a feature point extraction unit 41 for extracting a feature point from sample points stored in the point data storage unit 14 and a line kind determination unit 42 for determining a kind of a line of a section between feature points based on point data of two feature points and point data of sample points between the two feature points.

The graphic form input unit 11, the point sequence reading unit 12, the thinning-out unit 13, the point data storage unit 14, the shape of graphic form determination unit 17 and the recognition result display unit 18, which are the same as those of the above-described first embodiment, are all given the same reference numerals and description thereof is omitted.

The feature point extraction unit 41 may be arranged similarly to that of the feature extraction unit 15 of the above-described first embodiment or may be a conventional feature point extraction unit. It is clear that the arrangement is similar to the feature point extraction unit 15 can achieve higher precision of graphic form recognition.

The line kind determination unit 42, as illustrated in FIG. 4, comprises a separate elevation angle storage portion 421 for storing an elevation angle formed by line segments joining each of two feature points extracted by the feature point extraction unit 41 and a sample point sandwiched between the feature points and a line kind determination portion 422 for determining a kind of a line of a section between the feature points based on a separate elevation angle stored in the separate elevation angle storage portion 421. The separate elevation angle storage portion 421 is implemented by a CPU operable under program control and a RAM etc. having a liner list structure or a tree structure. The line kind determination portion 422 is implemented under program control by a CPU or the like.

The separate elevation angle storage portion 421 first inputs two successive feature points from the feature point extraction unit 41. Then, the portion 421 reads point data of sample points sandwiched between the two feature points, expect for those in the vicinity of the feature points, from the point data storage unit 14 and sequentially takes the data as a notice point. With respect to each notice point, the separate elevation angle storage portion 421 then finds an elevation angle formed by two line segments joining the notice point and each of the feature points, normalizes the elevation angle to 0 to 180 degrees and stores the normalized angle.

The line kind determination portion 422 finds variance and a mode of each separate elevation angle at a section between two feature points stored in the separate elevation angle storage portion 421. Then, based on whether the variance and the mode of the separate elevation angle are greater than their corresponding predetermined threshold values, the portion 422 determines a kind of a line of the section.

Figure 5:
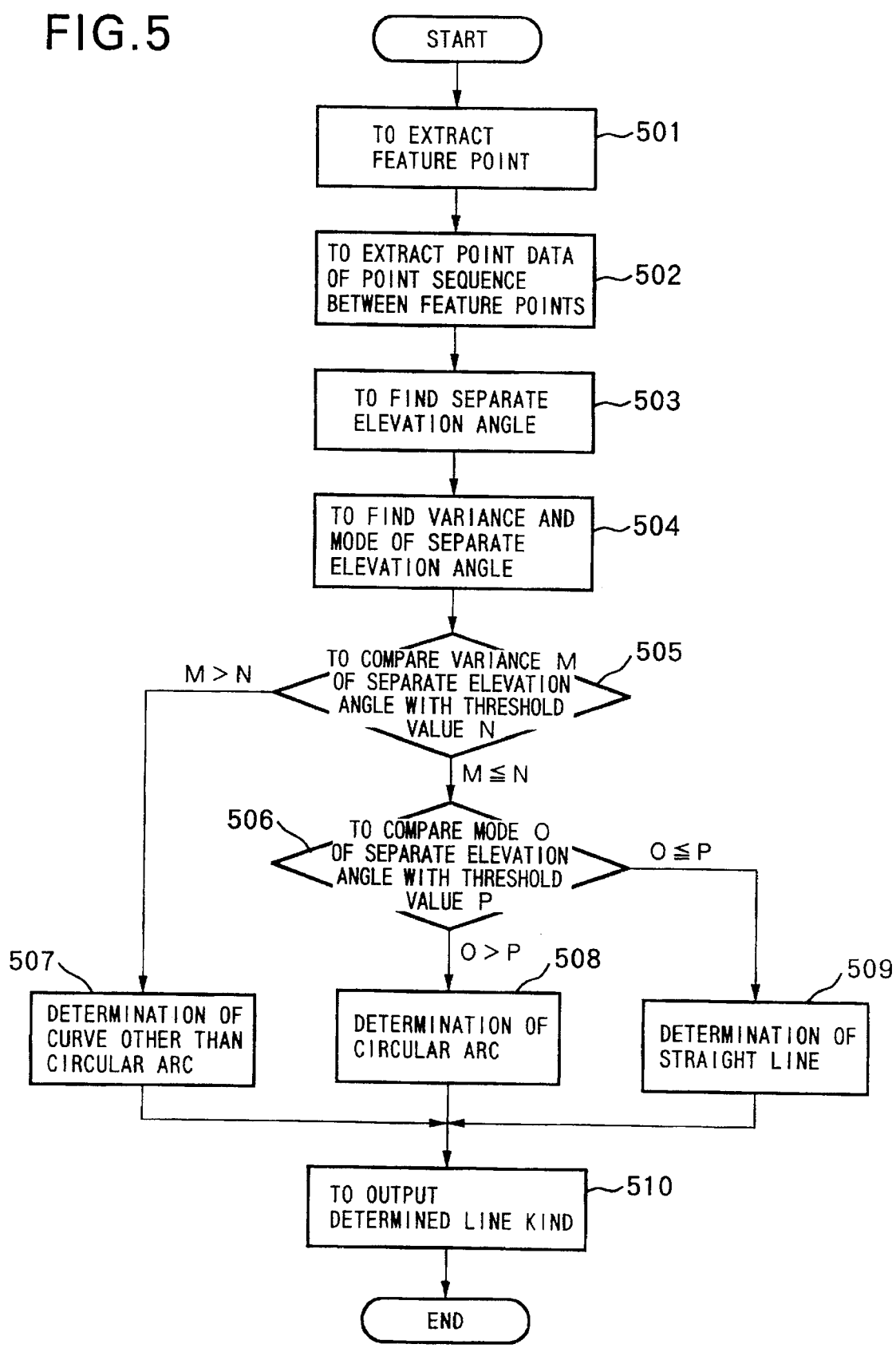
FIG. 5 is a flow chart showing operation of the present embodiment.
Figure 6:
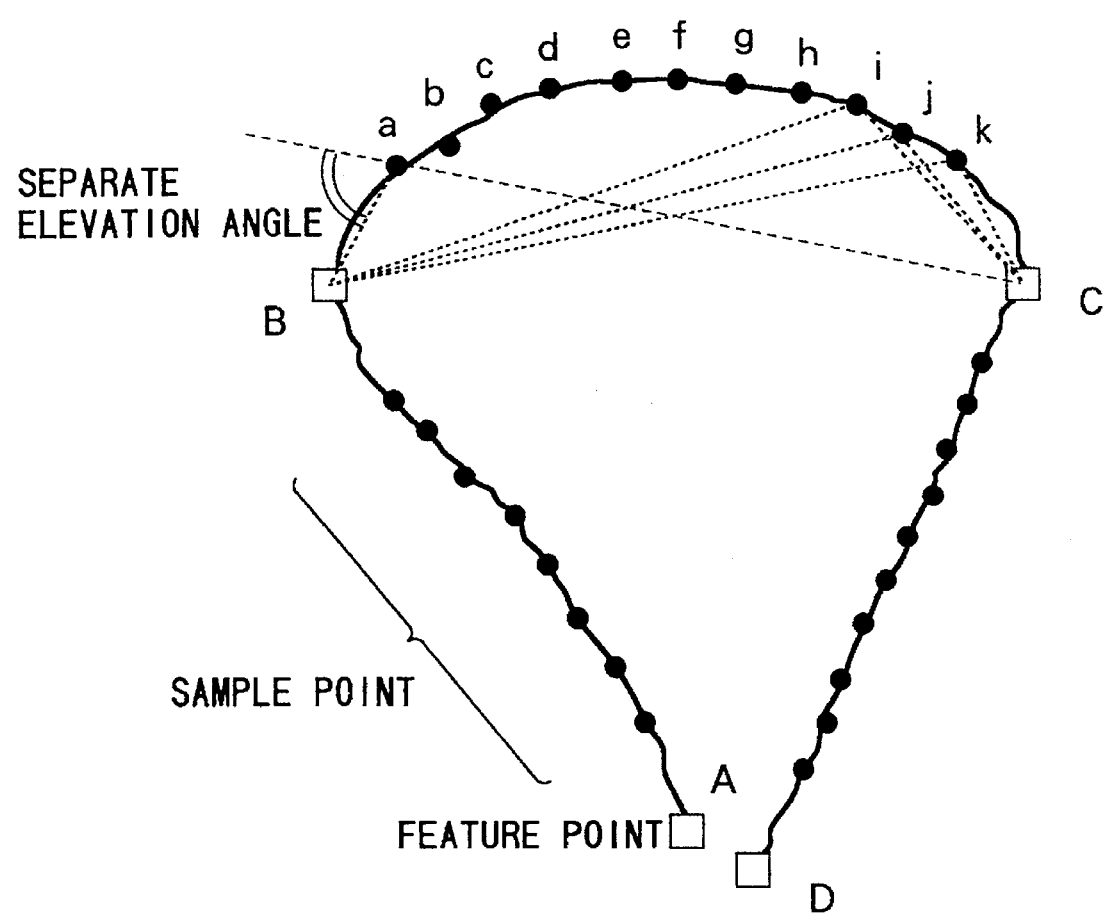
FIG. 6 is a diagram showing an example of an input graphic form according to the present embodiment.

Operation of the line kind determination unit 42 will be described in detail with reference to the flow chart of FIG. 5 and FIG. 6, assuming that the graphic form ABCD shown in FIG. 6 is input to the present embodiment to determine a kind of line of a section BC.

When the feature point extraction unit 41 extracts the two successive feature points B and C (Step 501), the separate elevation angle storage portion 421 receives inputs of point data of sample points a to k between the feature points B and C from the point data storage unit 14 (Step 502). Then, with respect to each of the sample points a to k, the portion 421 finds and stores an elevation angle formed by line segments (expressed by broken lines) joining each of the sample points a to k and each of the feature points B and C (Step 503).

The line kind determination portion 422 then finds variance and a mode of a separate elevation angle with respect to each of the sample points a to k stored in the separate elevation angle storage portion 41 (Step 504) and compares the variance and the mode with their corresponding threshold values.

First, when the variance M of the separate elevation angle is not greater than a third threshold value N and the absolute value 0 of the mode is not greater than a fourth threshold value P, determination is made that the section sandwiched between the feature points B and C is a straight line (Steps 505, 506 and 509). When the variance M of the separate elevation angle is not greater than the first threshold value N and the absolute value 0 of the mode is greater than the second threshold value P, determination is made that the section sandwiched between the feature points B and C is a circular arc (Steps 505, 506 and 508). When the variance M of the separate elevation angle is greater than the first threshold value N, determination is made that the section between the feature points B and C is a curve other than a circular arc (Steps 505 and 507).

Lastly, thus determined line kind is output to the shape of graphic form determination unit 17 (Step 510).

As described in the foregoing, the graphic form recognizer according to the present embodiment determines a kind of a line based on an elevation angle formed by two line segments joining a sample point sandwiched between two feature points and each of the two feature points.

Since the line segment joining the sample point between the feature points and each of the feature points is considerably longer than a line segment joining adjacent sample points, even a change of position of a sample point varies each elevation angle little. That is, the above recognizer is unsusceptible to the effects of random noise.

For the same reason as the above, the graphic form recognizer of the present embodiment can find an elevation angle of an input graphic form of the constant definition with high accuracy.

In addition, there is no effect of burst noise with low frequency because a kind of a line is determined by obtaining variance and a mode of these elevation angles.

It is therefore possible to make preferable determination of a line kind less affected by random noise or burst noise.

Figure 7:
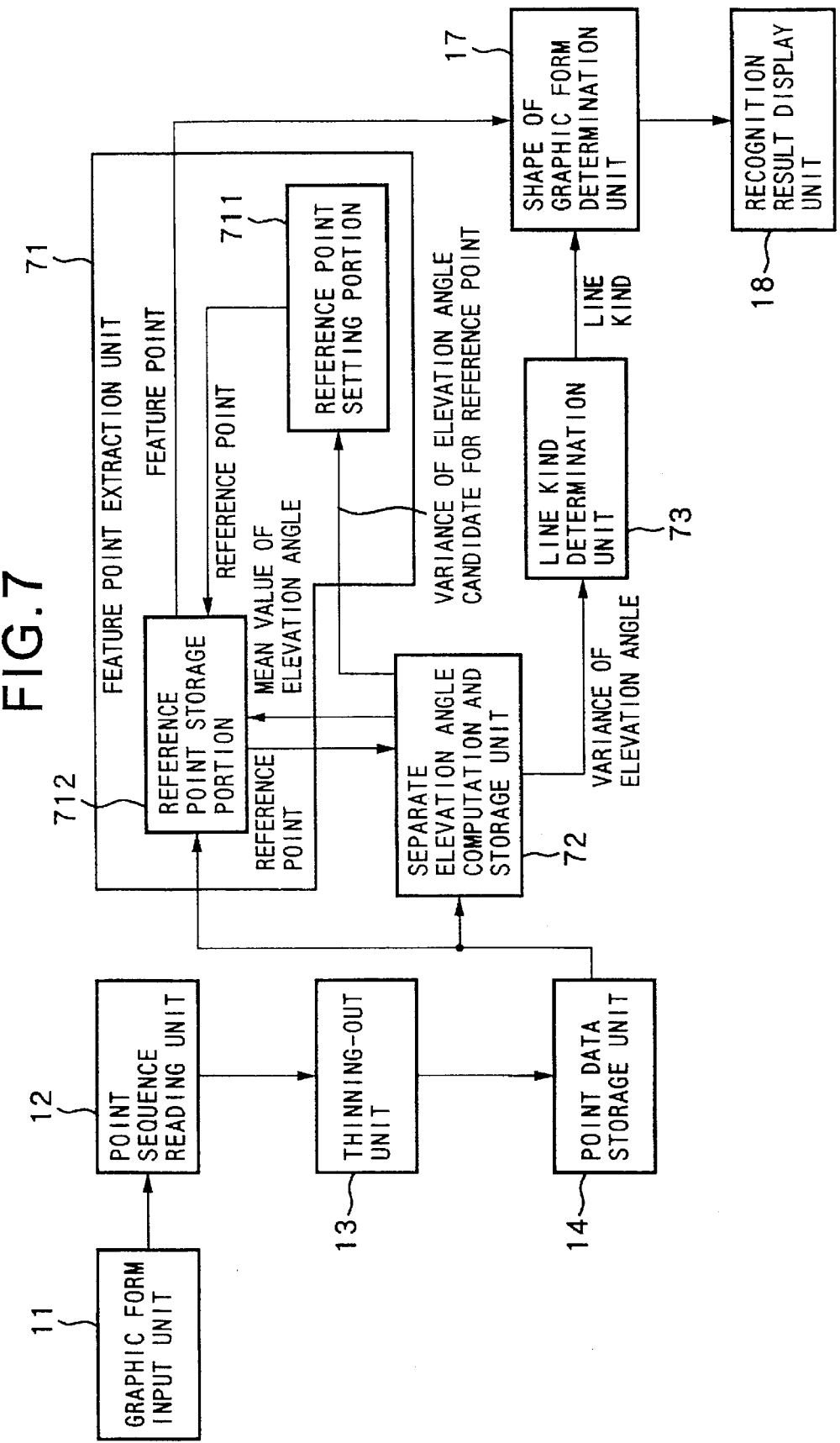
FIG. 7 is a block diagram showing an arrangement of a graphic form recognizer according to a third embodiment.
Figure 8:
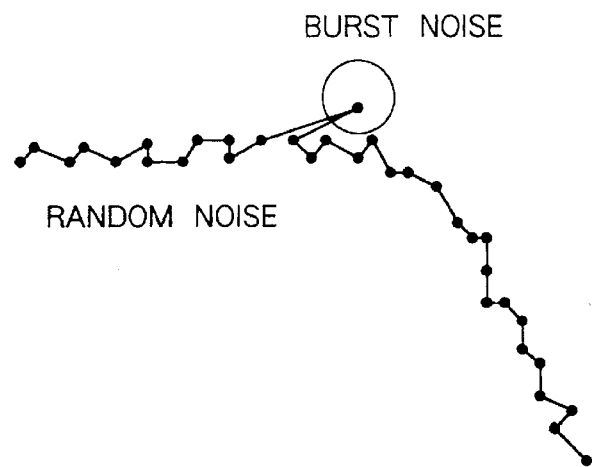
FIG. 8 is a diagram showing a state of noise generated in an input graphic form.
Figure 9:
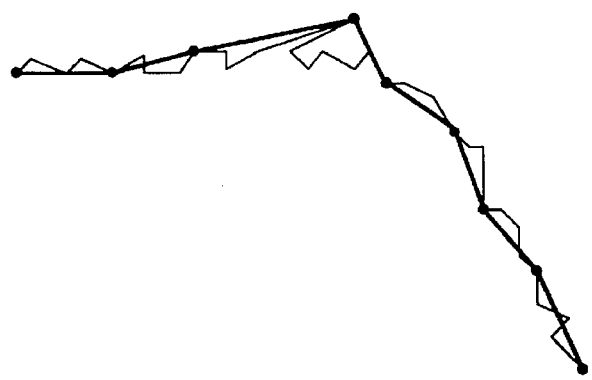
FIG. 9 is a diagram showing one example of a method of extracting a feature point from the graphic form illustrated in FIG. 8.
Figure 10:
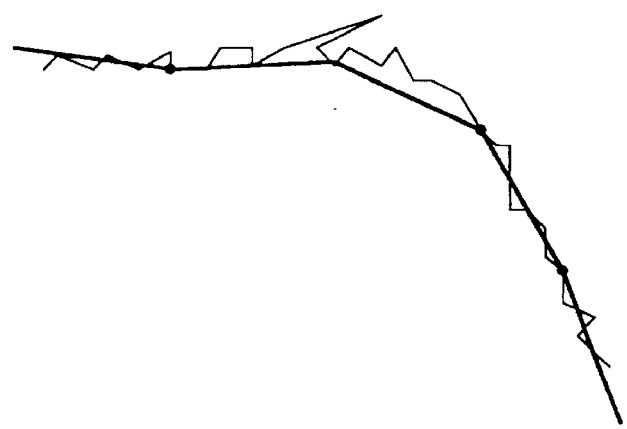
FIG. 10 is a diagram showing one example of a method of extracting a feature point from the graphic form illustrated in FIG. 8.
Figure 11A:
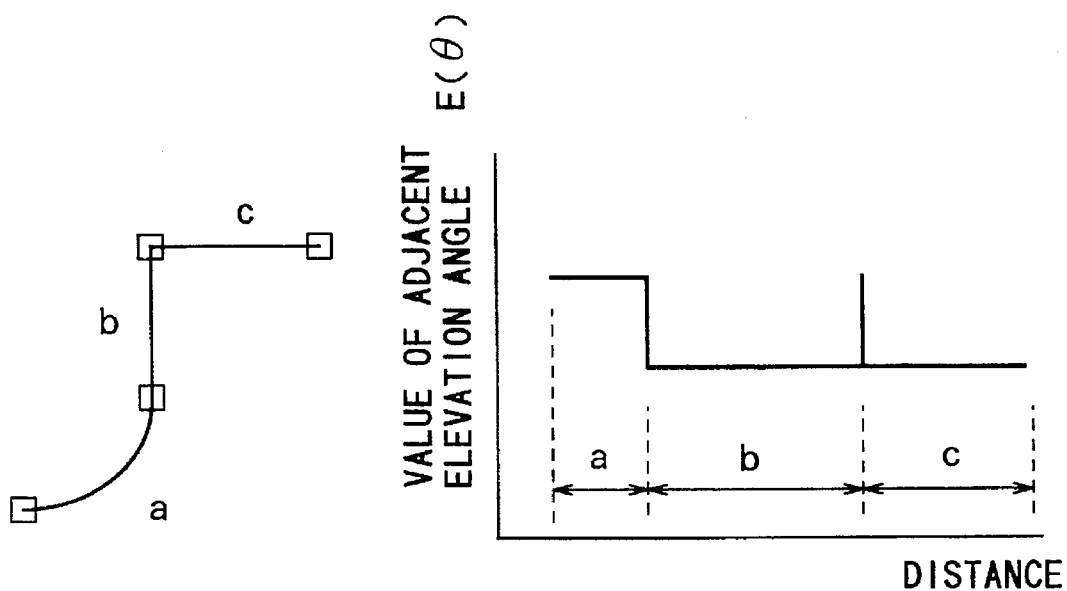
FIG. 11A is a diagram showing a function of an adjacent elevation angle corresponding to an input graphic form.
Figure 11B:
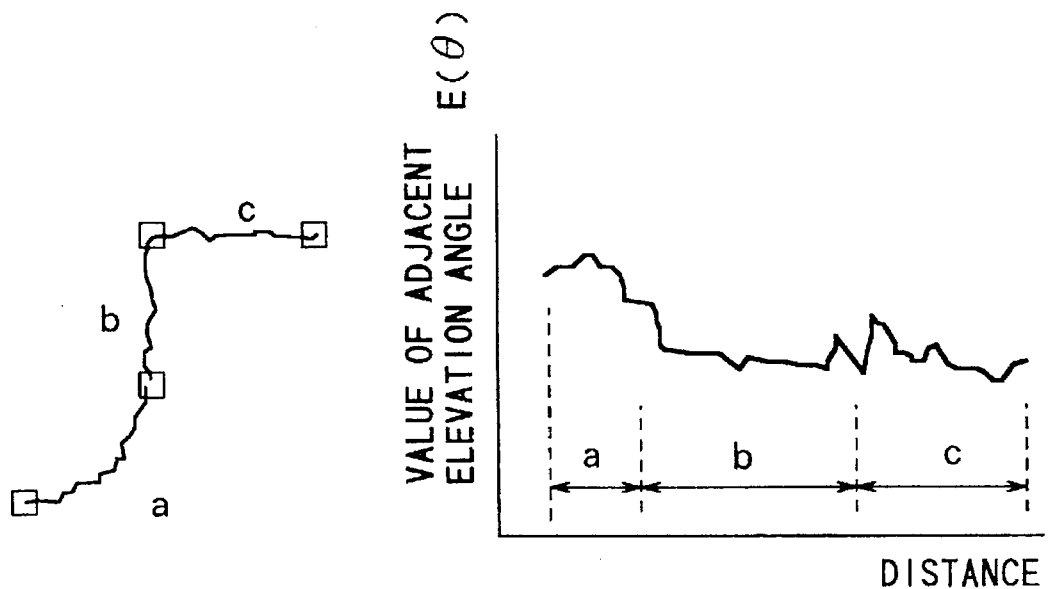
FIG. 11B is a diagram showing a state of noise generated in the input graphic form illustrated in FIG. 14A.
Figure 12A:
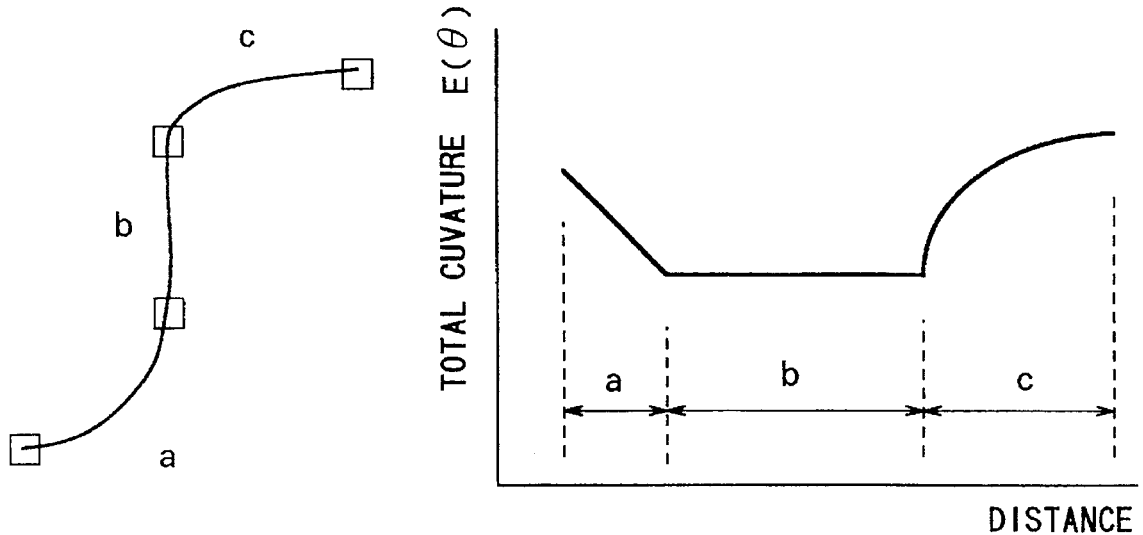
FIG. 12A is a diagram showing a function of total curvature corresponding to an input graphic form.
Figure 12B:
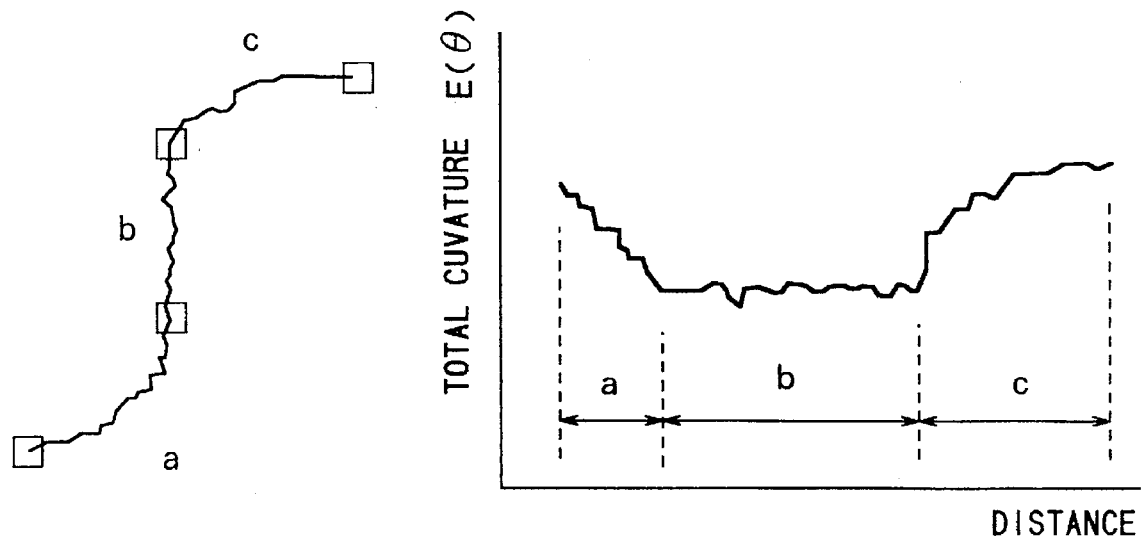
FIG. 12B is a diagram showing a state of noise generated in the input graphic form illustrated in FIG. 15A.

FIG. 7 is a block diagram showing an arrangement of a graphic form recognizer according to a third embodiment.

As illustrated in the figure, the graphic form recognizer of the present embodiment comprises a graphic form input unit 11, a point sequence reading unit 12, a thinning-out unit 13, a point data storage unit 14, a shape of graphic form determination unit 17 and a recognition result display unit 18, all of which are the same as those of the first embodiment shown in FIG. 1, and further comprises a feature point extraction unit 71 for setting reference points from among sample points stored in the point data storage unit 14 and extracting a feature point from the reference points, a separate elevation angle computation and storage unit 72 for computing and storing an elevation angle formed by two line segments joining a sample point between two reference points and each of the reference points, and a line kind determination unit 73 for determining a kind of a line of a section between the two feature points based on point data of the two feature points and an elevation angle corresponding to each sample point between the two feature points.

The graphic form input unit 11, the point sequence reading unit 12, the thinning-out unit 13, the point data storage unit 14, the graphic form determination unit 17 and the recognition result display unit 18, which are the same as those of the above-described first embodiment, are given the same reference numerals and description thereof is omitted. As illustrated in FIG. 7, the feature point extraction unit 71 comprises a reference point setting portion 711 for setting a reference point based on a computation result of the separate elevation angle computation unit 72 and a reference point storage portion 712 for storing a reference point set by the reference point setting portion 711. These functions are the same as those of the reference point setting portion 152 and the reference point storage portion 153 of the first embodiment shown in FIG. 1. The reference point setting portion 711 is implemented under program control by a CPU of a personal computer or a workstation. The reference point storage portion 712 is implemented by a CPU operable under program control and a RAM or the like having a liner list structure or a tree structure.

The separate elevation angle computation and storage unit 72 is implemented under program control by a CPU and a RAM etc. having a liner list structure or a tree structure. The separate elevation angle computation and storage unit 72 first receives an input of two successive reference points from the reference point storage portion 711 in the feature point extraction unit 71. Then, the unit 72 reads point data of sample points sandwiched between the two reference points, except for those in the vicinity of the reference points, from the point data storage unit 14 and sequentially takes the point data as a notice point. On this occasion, the point data may be thinned out at fixed intervals, similarly to the case of the first embodiment.

With respect to each notice point, the separate elevation angle computation unit 72 finds an elevation angle formed by two line segments joining each notice point and each of the reference points, computes a mean value and variance of the elevation angle and stores the mean value and the variance. The unit 72 also extracts data of a notice point at which a rate of elevation angle change is the largest. Then, the unit 72 outputs the variance of elevation angle to the reference point setting portion 711 of the feature point extraction unit 71 and the line kind determination unit 73, the point data at which the rate of elevation angle change is the largest to the reference point setting portion 711, and the mean value of the elevation angle to the reference point setting portion 712.

The reference point setting portion 711 of the feature point extraction unit 71 compares the variance of the elevation angle computed by the separate elevation angle computation unit 72 with a first predetermined threshold value set and stored beforehand. Then, when the variance of elevation angle is not less than the first threshold value, the portion 711 outputs, to the reference point storage portion 712, the data of the point at which the rate of elevation angle change is the largest, as a new reference point for dividing the section between the two reference points.

The reference point storage portion 712 stores the point data of the reference point applied from the reference point setting portion 711 and also converts the mean value of the elevation angle applied from the separate elevation angle computation and storage unit 72 into a curvature of a section sandwiched between two reference points and stores the curvature. Then, when no new reference point is set for dividing the section sandwiched between the two reference points, comparison is made between the curvature of the section and a curvature of its contiguous section. When the difference between the curvatures is not greater than a second predetermined threshold value set and stored beforehand, the two sections are integrated into one.

Figure 2:
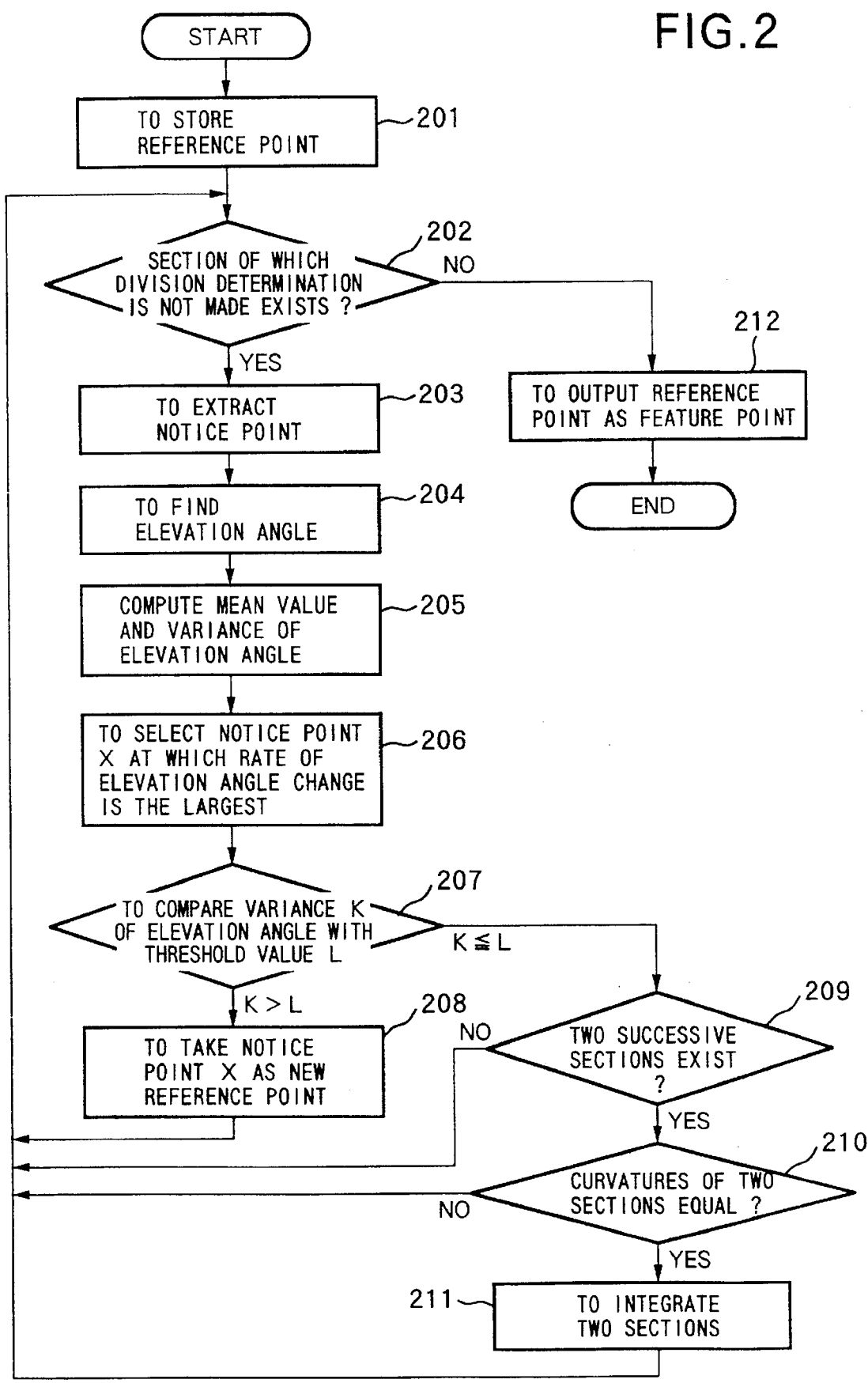
FIG. 2 is a flow chart showing operation according to the present embodiment.

As described in the foregoing, the feature point extraction unit 71 and the separate elevation angle computation and storage unit 72 repeat division and integration processings until there are left in the reference point storage portion 712 no section whose division determination is not made (see the flow chart of FIG. 2). Then, the reference point storage portion 712 outputs a reference point remaining to the last as a feature point.

The line kind determination unit 73, to be implemented under program control by a CUP of a personal computer or a workstation etc., finds a mode of separate elevation angles in a section between two reference points stored in the elevation angle computation and storage portion 72. Then, based on whether or not the variance and the mode of the separate elevation angle are greater than their corresponding predetermined threshold values, the unit 73 determines a kind of a line of the section. The line kind determination manner is the same as that by the line kind determination portion 422 in the line kind determination unit 42 of the second embodiment shown in FIG. 4 (see the flow chart of FIG. 5).

Similar to the first embodiment, thus arranged graphic form recognizer of the present embodiment divides a section based on variance of elevation angles each formed by two line segments joining each sample point sandwiched between two reference points and each of the reference points. Similar to the second embodiment, the recognizer of the present embodiment determines a kind of a line based on an elevation angle formed by two line segments joining a sample point between two reference points and each of the reference points.

Since a line segment joining a sample point between reference points and each of the reference points is considerably longer than that joining adjacent sample points, even a change of position of a sample point varies each elevation angle little. That is, the above recognizer is unsusceptible to the effects of random noise.

For the same reason as the above, it is possible to find an elevation angle of an input graphic form of the constant definition, which is a basis for determining division of a section, with high definition.

In addition, because division of a section is determined by obtaining variance of these elevation angles, there is no effect of burst noise with low frequency even if sample point has a wide variation of distance.

It is therefore possible to make preferable feature point extraction and line kind determination less affected by random noise or burst noise.

Although the preferred embodiments have been described in detail in the foregoing, it will be apparent to those skilled in the art that many modifications and variations may be made without departing from the spirit of the invention, and these are therefore considered to be within the scope of the invention as defined by the following claims.

What is claimed is:

1. A graphic form recognizer comprising:
   input means for inputting a graphic form to recognize the graphic form as a sequence of points;
   feature point extracting means for extracting feature points, including an endpoint, a flection point and an inflection point of the input graphic form, from the sequence of points constituting the input graphic form;
   line kind determining means for determining a kind of a line of a section sandwiched between said extracted feature points based on the extracted feature points and the sequence of points between the extracted feature points; and
   determining means for determining a shape of the input graphic form based on said feature points and said determined line kind;
   wherein said feature point extracting means includes
       computing means for extracting two reference points defining a predetermined section of the input graphic form from the sequence of points and computing a separate elevation angle formed by each line segment joining each point of said sequence of points sandwiched between the two reference points and each of the two reference points to compute a mean value and variance of the separate elevation angle;
       reference point setting means for setting a new reference point in the section sandwiched between said two reference points or integrating the section with another contiguous section according to said computed mean value and variance of the separate elevation angle; and
       outputting means for outputting the reference points, which remain after processing by said reference point setting means, as said feature points.

2. The graphic form recognizer according to claim 1, wherein said reference point setting means sets, as said new reference point, a point at which a rate of change of an adjacent elevation angle is the largest, when said computed variance of the adjacent elevation angle is not less than a predetermined threshold value.

3. The graphic form recognizer according to claim 1, wherein said reference point setting means comprises:
   means for converting said mean value of the separate elevation angle into a curvature of a section sandwiched between said two reference points;
   means for comparing the curvature of the section sandwiched between said two reference points with a curvature of another section adjacent to said section when no new reference point for dividing said section is set; and
   means for integrating the two sections into one section when the difference between the curvatures is not greater than a predetermined threshold value.

4. The graphic form recognizer according to claim 1, wherein said reference point setting means comprises:
   means for setting, as said new reference point, a point at which a rate of change of an adjacent elevation angle is the largest, when a computed variance of the adjacent elevation angle is not less than a first predetermined threshold value;
   means for converting a mean value of the adjacent elevation angle into a curvature of a section sandwiched between said two reference points;
   means for comparing the curvature of the section sandwiched between said two reference points with a curvature of another section adjacent to said section when no new reference point for dividing said section is set; and
   means for integrating the two sections into one when the difference between the curvatures is not greater than a second predetermined threshold value.

5. A graphic form recognizer comprising:
   input means for inputting a graphic form to recognize the graphic form as a sequence of points;
   feature point extracting means for extracting feature points, including an endpoint, a flection point and an inflection point of the input graphic form, from the sequence of points constituting the input graphic form;
   line kind determining means for determining a kind of a line of a section sandwiched between said extracted feature points based on the extracted feature points and the sequence of points between the extracted feature points; and
   determining means for determining a shape of the input graphic form based on said feature points and said determined line kind;
   wherein said line kind determining means includes
       first computing means for computing a separate elevation angle formed by each line segment joining each point of said sequence of points sandwiched between two feature points and each of said two feature points to compute variance and a mode of the separate elevation angle; and
       second computing means for determining a kind of a line sandwiched between said two feature points according to said variance and mode of the separate elevation angle.

6. The graphic form recognizer according to claim 5, wherein said second computing means compares said variance and mode of the separate elevation angle with first and second threshold values, respectively, to determine that the section sandwiched between said two feature points is a straight line when the variance of the separate elevation angle is not greater than the first threshold value and the absolute value of the mode is not greater than the second threshold value, to determine that the section sandwiched between said two feature points is a circular arc when the variance of the separate elevation angle is not greater than the first threshold value and the absolute value of the mode is greater than the second threshold value, and to determine that the section sandwiched between said two feature points is a curve other than a circular arc when the variance of the separate elevation angle is greater than the first threshold value.

7. A graphic form recognizer comprising:

input means for inputting a graphic form to recognize the graphic form as a sequence of points;

computing means for extracting two reference points defining a predetermined section of the input graphic form from the sequence of points and computing a separate elevation angle formed by each line segment joining each point of said sequence of points sandwiched between the two reference points and each of the two reference points to compute a mean value, variance, and mode of the separate elevation angle;

feature point extracting means for extracting feature points, including an endpoint, a flection point and an inflection point of the input graphic form, from the sequence of points constituting the input graphic form;

line kind determining means for determining a kind of a line of a section sandwiched between said extracted feature points based on the extracted feature points and the sequence of points between the extracted feature points; and determining means for determining a shape of the input graphic form based on said feature points and said determined line kind;

said feature point extracting means including reference point setting means for setting a new reference point in the section sandwiched between said two reference points or integrating the section with another contiguous section according to said computed mean value and variance of the separate elevation angle; and said line kind determining means including determining means for determining a kind of a line of the section sandwiched between said extracted feature points according to said computed variance and mode of the separate elevation angle.

8. The graphic form recognizer according to claim 7, wherein said reference point setting means sets, as said new reference point, a point at which a rate of change of an adjacent elevation angle is the largest, when a computed variance of the adjacent elevation angle is not less than a first predetermined threshold value; and said reference point setting means includes means for converting said mean value of the adjacent elevation angle into a curvature of a section sandwiched between said two reference points, means for comparing the curvature of the section sandwiched between said feature points with a curvature of another section adjacent to said section when no new reference point for dividing said section is set, and means for integrating the two sections into one when the difference between the curvatures is not greater than a second predetermined threshold value.

9. The graphic form recognizer according to claim 7, wherein said line kind determining means compares said variance and mode of the separate elevation angle with first and second threshold values, respectively, to determine that the section sandwiched between said feature points is a straight line when the variance of the separate elevation angle is not greater than the first threshold value and the absolute value of the mode is not greater than the second threshold value, to determine that the section sandwiched between said feature points is a circular arc when the variance of the separate elevation angle is not greater than the first threshold value and the absolute value of the mode is greater than the second threshold value, and to determine that the section sandwiched between said feature points is a curve other than a circular arc when the variance of the separate elevation angle is greater than the first threshold value.

10. The graphic form recognizer according to claim 7, wherein said reference point setting means sets, as said new reference point, a point at which a rate of change of an adjacent elevation angle is the largest, when a computed variance of the adjacent elevation angle is not less than a predetermined first threshold value;

said reference point setting means includes means for converting said mean value of the adjacent elevation angle into a curvature of a section sandwiched between said two reference points, means for comparing the curvature of the section sandwiched between said two reference points with a curvature of another section adjacent to said section when no new reference point is set, and means for integrating the two sections into one when the difference between the curvatures is not greater than a second predetermined threshold value; and said line kind determining means compares said variance and mode of the separate elevation angle with third and fourth threshold values, respectively, to determine that the section sandwiched between said two reference points is a straight line when the variance of the separate elevation angle is not greater than the third threshold value and the absolute value of the mode is not greater than the fourth threshold value, to determine that the section sandwiched between said two reference points is a circular arc when the variance of the separate elevation angle is not greater than the third threshold value and the absolute value of the mode is greater than the fourth threshold value, and to determine that the section sandwiched between said two reference points is a curve other than a circular arc when the variance of the separate elevation angle is greater than the third threshold value.

11. A method of recognizing a graphic form comprising the steps of:

inputting a graphic form to recognize the graphic form as a sequence of points;

extracting feature points, including an endpoint, a flection point and an inflection point of the input graphic form, from the sequence of points constituting the input graphic form;

determining a kind of a line of a section sandwiched between said extracted feature points based on the extracted feature points and the sequence of points between the extracted feature points; and determining a shape of the input graphic form based on said feature points and said determined line kind;

wherein the step of extracting includes the steps of:

extracting two reference defining a predetermined section of the input graphic form from the sequence of points and computing a separate elevation angle formed by each line segment joining each point in said sequence of points sandwiched between the two reference points and each of the two reference points to compute a mean value and variance of the separate elevation angle;

setting, as a new reference point between said two reference points, a point at which a rate of change of an adjacent elevation angle is the largest, when a computed variance of the adjacent elevation angle is not less than a predetermined first threshold value;

converting said mean value of the adjacent elevation angle into a curvature of a section sandwiched between said two reference points;

comparing the curvature of the section sandwiched between said two reference points with a curvature of another section adjacent to said section when no new reference point is set; and integrating the two sections into one when the difference between the curvatures is not greater than a second predetermined threshold value.

12. A method of recognizing a graphic form comprising the steps of:

inputting a graphic form to recognize the graphic form as a sequence of points;

extracting feature points, including an endpoint, a flection point and an inflection point of the input graphic form, from the sequence of points constituting the input graphic form;

determining a kind of a line of a section sandwiched between said extracted feature points based on the extracted feature points and the sequence of points between the extracted feature points; and determining a shape of the input graphic form based on said feature points and said determined line kind;

wherein the step of determining said line kind includes the steps of:

computing a separate elevation angle formed by each line segment joining each point of said sequence of points sandwiched between two feature points and each of said two feature points to compute variance and a mode of the separate elevation angle; and comparing said variance and mode of the separate elevation angle with first and second threshold values, respectively, to determine that the section sandwiched between said two feature points is a straight line when the variance of the separate elevation angle is not greater than the first threshold value and the absolute value of the mode is not greater than the second threshold value, to determine that the section sandwiched between said two feature points is a circular arc when the variance of the separate elevation angle is not greater than the first threshold value and the absolute value of the mode is greater than the second threshold value, and to determine that the section sandwiched between said two feature points is a curve other than a circular arc when the variance of the separate elevation angle is greater than the first threshold value.

13. A method of recognizing a graphic form comprising the steps of:

inputting a graphic form to recognize the graphic form as a sequence of points;

extracting two reference points defining a predetermined section of the input graphic form from the sequence of points and computing a separate elevation angle formed by each line segment joining each point of said sequence of points sandwiched between the two reference points and each of the two reference points to compute a mean value, variance and mode of the separate elevation angle;

extracting feature points, including an endpoint, a flection point and an inflection point of the input graphic form, from the sequence of points constituting the input graphic form;

determining a kind of a line of a section sandwiched between said extracted feature points based on the extracted feature points and the sequence of points between the extracted feature points; and determining a shape of the input graphic form based on said feature points and said determined line kind;

wherein the step of extracting includes the steps of:

setting, as a new reference point between said two reference points, a point at which a rate of change of an adjacent elevation angle is the largest, when a computed variance of the adjacent elevation angle is not less than a first predetermined threshold value;

converting said mean value of the adjacent elevation angle into a curvature of a section sandwiched between said two reference points;

comparing the curvature of the section sandwiched between said two reference points with a curvature of another section adjacent to said section when no new reference point is set; and integrating the two sections into one when the difference between the curvatures is not greater than a second predetermined value; and wherein the step of determining line kind includes the step of:

comparing said variance and mode of the separate elevation angle with third and fourth threshold values, respectively, to determine that the section sandwiched between said two reference points is a straight line when the variance of the separate elevation angle is not greater than the third threshold value and the absolute value of the mode is not greater than the fourth threshold value, to determine that the section sandwiched between said two reference points is a circular arc when the variance of the separate elevation angle is not greater than the third threshold value and the absolute value of the mode is greater than the fourth threshold value, and to determine that the section sandwiched between said two reference points is a curve other than a circular arc when the variance of the separate elevation angle is greater than the third threshold value.

* * * * *